(12) United States Patent
Fayer et al.

(10) Patent No.: US 6,614,515 B2
(45) Date of Patent: Sep. 2, 2003

(54) METHOD AND APPARATUS FOR DISPERSION MEASUREMENT

(75) Inventors: Alex Fayer, Herzelia (IL); Serge Steinblatt, Raanana (IL)

(73) Assignee: LaserComm, Inc., Plano, TX (US)

( * ) Notice: Subject to any disclaimer, the term of this patent is extended or adjusted under 35 U.S.C. 154(b) by 0 days.

(21) Appl. No.: 10/265,132

(22) Filed: Oct. 7, 2002

(65) Prior Publication Data

US 2003/0128354 A1 Jul. 10, 2003

Related U.S. Application Data (60) Provisional application No. 60/331,493, filed on Nov. 19, 2001.

(51) Int. Cl.[7] ............................................. G01N 21/00
(52) U.S. Cl. ............................................. 356/73.1
(58) Field of Search ................... 356/73.1; 359/341.44, 359/341.3, 135–138, 173–177, 110, 247, 124–134, 167, 496; 385/37, 12, 24

(56) References Cited

U.S. PATENT DOCUMENTS

| | | | |
|---|---|---|---|
| 4,714,343 A | * 12/1987 | Ide | 356/73.1 |
| 5,185,827 A | 2/1993 | Poole | 385/28 |
| 5,261,016 A | 11/1993 | Poole | 385/28 |
| 5,995,228 A | 11/1999 | Otani et al. | 356/364 |
| 6,088,088 A | 7/2000 | Fortenberry | 356/73.1 |
| 6,154,273 A | 11/2000 | Suzuki | 356/73.1 |
| 6,246,811 B1 | 6/2001 | Kim et al. | 385/28 |
| 6,404,951 B2 | 6/2002 | Danziger | 385/28 |
| 6,404,952 B1 | 6/2002 | Danziger | 385/28 |
| 6,418,256 B1 | 7/2002 | Danziger et al. | 385/123 |
| 6,456,370 B1 * | 9/2002 | Ingles, Jr. | 356/73.1 |

FOREIGN PATENT DOCUMENTS

| | | | |
|---|---|---|---|
| JP | 362042027 A | * | 2/1987 |
| JP | 363218837 A | * | 9/1988 |

* cited by examiner

*Primary Examiner*—Tu T. Nguyen
(74) *Attorney, Agent, or Firm*—Simon Kahn (57) ABSTRACT

A method of measuring dispersion in an optical fiber from one end is disclosed. An optical measurement signal comprising timed pulses is input into one end of the fiber, and a small loop is formed at the point to which total dispersion is to be measured. In one embodiment the loop is formed so as to increase the amount of detectable light that escapes the fiber at the loop, and the escaping light pulses are monitored by a free space detector. The wavelength of the optical measurement signal is varied, and the change in propagation delay of the detected optical pulses is measured, thus indicating the dispersion. In a second embodiment the loop is formed so as to increase the amount of loss in the optical measurement signal, and an OTDR is utilized.

20 Claims, 4 Drawing Sheets

METHOD AND APPARATUS FOR DISPERSION MEASUREMENT

CROSS-REFERENCE TO RELATED APPLICATIONS

The present application claims the benefit of the filing date of co-pending U.S. provisional application, S/No. 60/331,493 filed Nov. 19, 2001, entitled "METHOD FOR DISPERSION MEASUREMENT".

FIELD OF THE INVENTION

The invention relates generally to optical fiber measurement and more particularly to a method for dispersion measurement of uncut fibers.

BACKGROUND OF THE INVENTION

Optical fiber has become increasingly important in many applications involving the transmission of light. When light is transmitted through an optical fiber, the energy follows a number of paths that are called modes. A mode is a spatially invariant electric field distribution along the length of the fiber. The fundamental mode, also known as the $LP_{01}$ mode, is the mode in which light passes substantially along the fiber axis. Modes other than the $LP_{01}$ mode, are known as high order modes. Fibers that have been designed to support only one mode with minimal loss, the $LP_{01}$ mode, are known as single mode fibers. A multi-mode fiber is a fiber whose design supports multiple modes, and typically supports over 100 modes. A few-mode fiber is a fiber designed to support only a very limited number of modes. For the purpose of this patent, we will define a few mode fiber as a fiber supporting no more than 20 modes at the operating wavelength band. Fibers may carry different numbers of modes at different wavelengths, however in telecommunications the typical wavelengths are near 1310 nm and 1550 nm.

As light traverses the optical fiber, different groups of wavelengths travel at different speeds depending on their wavelength, which leads to chromatic dispersion. Chromatic dispersion is defined as the differential of the group velocity in relation to the wavelength in units of picosecond/nanometer (ps/nm). In optical fibers the dispersion experienced by each wavelength of light is also different, and is primarily controlled by a combination of the material dispersion, and the dispersion created by the actual profile of the waveguide, known as waveguide dispersion. Total dispersion is defined as the algebraic sum of waveguide dispersion and material dispersion. Total dispersion in this patent refers to chromatic dispersion. The units of total dispersion are in ps/nm, and a waveguide fiber may be characterized by the amount of dispersion per unit length, in units of ps/nm/km.

The differential of the dispersion in relation to wavelength is known as the slope, or second order dispersion, and is expressed in units of $ps/nm^2$. Optical fibers may be further characterized by their slope per unit length of 1 kilometer, which is expressed in units of picosecond/nanometer$^2$/kilometer ($ps/nm^2/km$).

Measurement of chromatic dispersion of fibers in the fundamental mode is often accomplished by measuring the flight time differential of pulses of light at different wavelengths. In order to accomplish the measurement, prior art methods typically utilize a cut piece of fiber so as to measure the flight time of the pulse from the source of light to the end of the fiber whose dispersion is being measured. Unfortunately, cutting the fiber has negative consequences in that the cut fiber cannot be used if it is found to be too short for the desired application. It is possible to splice different pieces of fiber together, however this is not always desirable, as additional losses are incurred as a consequence of the splicing operation.

Few mode fibers designed to have specific characteristics in a mode other than the fundamental mode are also known as high order mode (HOM) fibers. The operative high order mode is also known as the desired mode. HOM fibers are particularly useful for compensating chromatic dispersion due to the large amount of negative dispersion that can be experienced by a signal traversing certain profiles in a high order mode. Unfortunately, HOM fibers are much more sensitive than single mode fibers to the actual profile of the fiber, and therefore it is desirable to characterize manufactured fibers in order to determine their actual dispersion characteristic prior to having the fiber cut to length. For HOM fibers, it is necessary to launch the light in a specific high order mode, which requires the use of a mode transformer. Splicing is disadvantageous, in that in addition to losses inherent in a splice, additional undesired modes are typically created. Prior art methods of measurement involve cutting the fiber to an estimated maximum length, measuring the actual fiber, and then proceeding to cut back further lengths and remeasure until the desired dispersion is achieved. These cut backs reduce the amount of fiber that is eventually useable, and thus leads to a large amount of waste.

Thus there is a need for a method of dispersion measurement of optical fibers that does not require cutting the fiber to a useable length prior to measurement.

SUMMARY OF THE INVENTION

Accordingly, it is a principal object of the present invention to overcome the disadvantages of prior art methods of dispersion measurement. This is provided in the present invention by an apparatus for measuring dispersion of a section of optical fiber beginning at one end of the fiber and ending at a point before the second end of the fiber comprising a light source that generates an optical measurement signal, the light source being optically connected to one end of the optical fiber whose dispersion is to be measured, a loop designed to modify the propagation of the optical measurement signal that is formed in the optical fiber at a point to which dispersion is to be measured, and a time delay measurement apparatus, wherein the wavelength of the optical measurement signal is variable and the time delay measurement apparatus is operable to detect the change in propagation time from the one end of the optical fiber to the loop as a function of wavelength.

In one embodiment the apparatus further comprises a pulse generator being operable to modulate the light source. In another embodiment the apparatus further comprises a detector operable to detect the modification to the propagation of the measurement signal.

In an exemplary embodiment the optical fiber is a high order mode fiber. In a further exemplary embodiment the apparatus comprises a mode transformer operable to transform the optical measurement signal to a high order mode.

In one embodiment the modification to the optical measurement signal comprises increasing the amount of detectable light escaping from the optical fiber, while in another embodiment the modification comprises increasing the amount of loss experienced by the optical measurement signal.

In one embodiment the light source comprises a tunable laser. In one exemplary embodiment the time delay measurement apparatus comprises an oscilloscope and in another exemplary embodiment the time delay measurement apparatus comprises an optical time domain reflectometer.

The invention also provides for a method for measuring dispersion of a section of optical fiber beginning at one end of the fiber and ending at a point before the second end of the fiber comprising the steps of generating an optical measurement signal, propagating the optical measurement signal in an optical fiber, modifying the propagation of the optical measurement signal at the desired measurement point, varying the wavelength of the optical measurement signal and measuring the change in propagation time from the one end to the desired measurement point as a function of wavelength.

In one embodiment the optical measurement signal comprises optical pulses. In another embodiment the method further comprises detecting the modification to the propagation of the measurement signal.

In an exemplary embodiment the optical fiber is a high order mode fiber. In a further exemplary embodiment the method comprises the step of transforming the optical measurement signal to a high order mode.

In one embodiment the modification to the optical measurement signal comprises increasing the amount of detectable light escaping from the optical fiber, while in another embodiment the modification comprises increasing the amount of loss experienced by the optical measurement signal.

In one embodiment the optical measurement signal is generated by a tunable laser. In one exemplary embodiment the measuring is accomplished by an oscilloscope and in another exemplary embodiment measurement is accomplished by an optical time domain reflectometer.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

The present embodiments enable dispersion measurement of a fiber without pre-cutting the fiber to a useable length by measuring the light energy leaving a loop of fiber over a number of wavelengths. In another embodiment the loop of fiber causes a large loss in at least one mode, and an optical time domain reflectometer is utilized to measure the location of the loop over a number of wavelengths.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
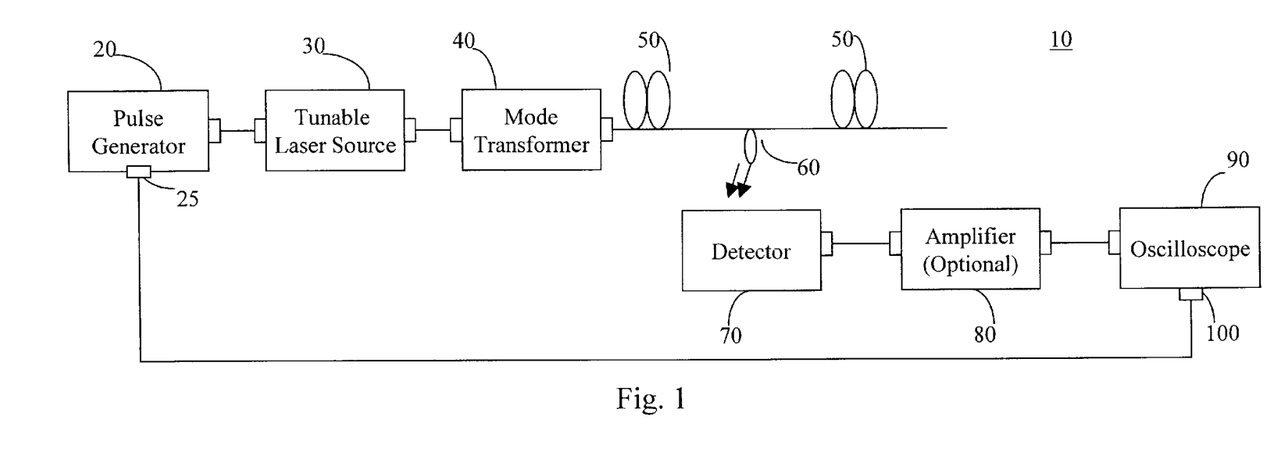
FIG. 1 depicts a high level block diagram of a first embodiment of a dispersion measurement system.

FIG. 1 illustrates a high level block diagram of a system 10 operable to measure the dispersion of a high order mode fiber comprising pulse generator 20 comprising trigger output 25, tunable laser source 30, mode transformer 40, HOM fiber 50, fiber loop 60, detector 70, optional amplifier 80 and oscilloscope 90 comprising trigger input 100. The output of pulse generator 20 is connected to the input of tunable laser source 30, and the output of tunable laser source 30 is connected to the input of mode transformer 40. The output of mode transformer 40 is connected to one end of HOM fiber 50, and fiber loop 60 is formed at a distance from that end of HOM fiber 50 as will be described below. Detector 70 is placed in proximity to fiber loop 60, and the output of detector 70 is connected to the input of optional amplifier 80. The output of optional amplifier 80 is connected to the input of oscilloscope 90, and trigger input 100 of oscilloscope 90 is connected to trigger output 25 of pulse generator 20. In the event that optional amplifier 80 is not utilized, the output of detector 70 is directly connected to the input of oscilloscope 90.

In operation, pulse generator 20 generates pulses to gate the tunable laser source. In an exemplary embodiment, the pulses are 4 nanoseconds in width, repeated at a frequency of 10 Khz. The output of pulse generator 20 is connected to the input of tunable laser source 30. Tunable laser source 30, is in one embodiment a tunable external cavity laser (ECL). The tunable laser source is modulated by the pulse generator, which acts as a gate to allow light pulses to exit the laser source 30 only during the pulse time. The tunable laser source 30 is initially set to one wavelength in the band to be measured, and during measurement is set to each wavelength point in the band for which a measurement is desired.

The output of tunable laser source 30, is fed to the input of mode transformer 40, which acts to transform the light pulses arriving in the fundamental mode, $LP_{01}$, to a high order mode. In a preferred embodiment the mode transformer is a transverse mode transformer of the type described in U.S. Pat. No. 6,404,951 entitled "Transverse Spatial Mode Transformer for Optical Communication" whose contents are incorporated herein by reference. In an exemplary embodiment the pulses are transformed to the $LP_{02}$ mode. The output of mode transformer 40 is connected to one end of HOM fiber 50. HOM fiber 50 comprises a length of fiber to be characterized with regards to its dispersion characteristics, and is a long length of fiber not yet cut to length for use in any device such as a dispersion management device. Such a dispersion management device is further described in U.S. Pat. No. 6,404,952 entitled "Optical Communication System with Chromatic Dispersion Compensation" whose contents are incorporated herein by reference.

Loop 60 is formed with a small enough diameter to emit a quantity of the desired high order modes light energy, sufficient for detection by detector 70, at the point to which a dispersion measurement of HOM 50 is desired. In one embodiment loop 60 is made around a circular object, while in another embodiment loop 60 is formed by holding it directly in place with tape. The exact diameter required to emit a sufficient quantity of light energy is known to those skilled in the art, and is easily determined by experiment, however in an exemplary embodiment to emit the $LP_{02}$ mode from HOM fiber, a loop of diameter 1.5 cm is used. The fiber may continue to any length after the loop, as shown by the continuing length of HOM fiber 50. Light exiting loop 60 is detected by detector 70, which in one embodiment is a DET 410 made by Thorlabls, Inc., Newton, N.J. Detector 70 is placed in close proximity to loop 60, so as to receive as much light energy escaping loop 60 as possible. In an exemplary embodiment, detector 70 is placed directly adjacent to light exiting loop 60. In another embodiment detector 70 is held in a jig or movable stage (not shown) which allows for a fine adjustment of the positioning of detector 70 with respect to loop 60.

The output of detector 70 is connected to the input of optional amplifier 80, which in one embodiment is an RF amplifier model 5850 available from Picosecond Pulse Labs, Boulder, Colo. Any suitable amplifier may be utilized with the only criterion being that the amplifier is suitable for the pulses to be detected. The output of amplifier 80 is fed to the input of oscilloscope 90, which has its trigger input 100 connected to electrical trigger output 25 of pulse generator 20. If the output of detector 70 is of sufficient amplitude to enable the proper measurement of the pulse by oscilloscope 90, optional amplifier 80 is not required, and the output of detector 70 is directly connected to the input of oscilloscope 90.

In calculating dispersion, the difference in flight time between a reference wavelength and a measurement wavelength is detected on oscilloscope 90. In an exemplary embodiment, the tunable laser source 30 is first set to 1530 nm and the pulse position is observed on the oscilloscope. The tunable laser source 30 is then set to 1535 nm, and again the pulse position is observed on the oscilloscope, and the differential in time is recorded as a data point. The procedure is repeated at every desired measurement wavelength, which in an exemplary embodiment comprises 2 nm steps. In another embodiment 5 nm steps are used, while in yet another embodiment 10 nm steps are used, and the dispersion in between measurement wavelengths is calculated. It is to be understood that utilizing a digital oscilloscope the pulse positions may be measured without requiring physical observation. Furthermore, oscilloscope 90 may be replaced by any electronic measurement equipment capable of measuring the time difference for peaks at different wavelengths.

In an exemplary embodiment for each measurement wavelength multiple data points are taken and average is used. In one exemplary embodiment 128 data points are utilized.

Figure 2:
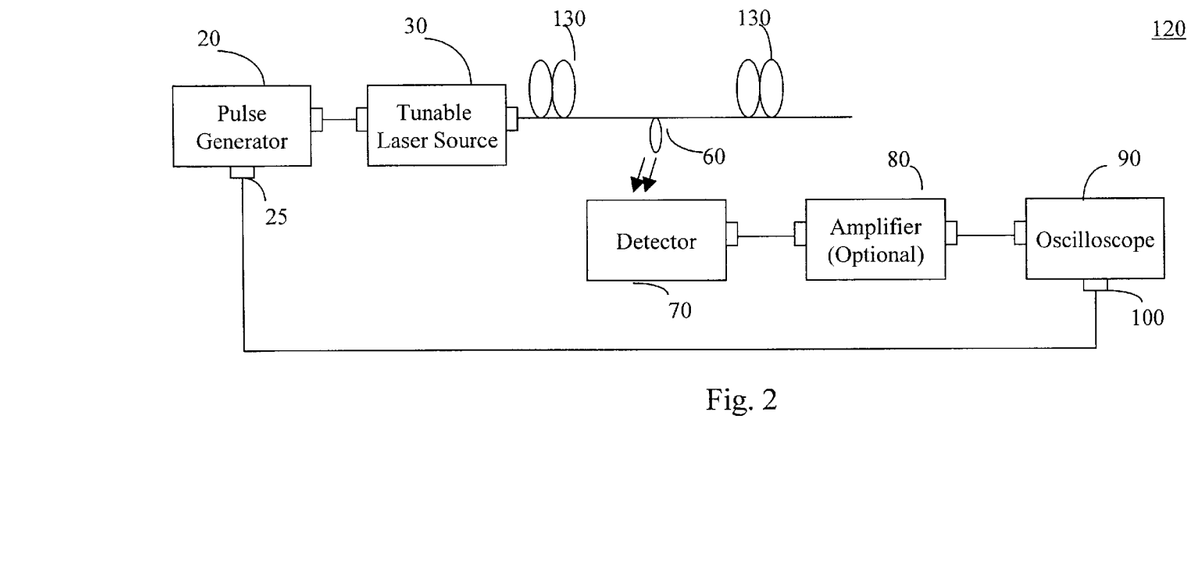
FIG. 2 depicts a high level block diagram of a second embodiment of a dispersion measurement system.

FIG. 2 illustrates a high level block diagram of a second embodiment of the invention, comprising system 120 which is operable to measure the dispersion of a single mode fiber in accordance with the teaching of the invention. System 120 comprises pulse generator 20 comprising trigger output 25, tunable laser source 30, single mode fiber 130, fiber loop 60, detector 70, optional amplifier 80 and oscilloscope 90 comprising trigger connection 100. The output of pulse generator 20 is connected to the input of tunable laser source 30, and the output of tunable laser source 30 is connected to one end of single mode fiber 130, and fiber loop 60 is formed at a distance from that end of single mode fiber 130 as will be described below. Detector 70 is placed in proximity to fiber loop 60, and the output of detector 70 is connected to the input of oscilloscope 90, and trigger input 100 of oscilloscope 90 is connected to trigger output 25 of pulse generator 20.

In operation, pulse generator 20 generates pulses to gate the tunable laser source. In an exemplary embodiment, the pulses are 4 nanoseconds in width, repeated at a frequency of 10 Khz. The output of pulse generator 20 is connected to the input of tunable laser source 30. Tunable laser source 30, is in one embodiment a tunable external cavity laser (ECL). The tunable laser source is modulated by the pulse generator, which acts as a gate to allow light pulses to exit the laser source 30 only during the pulse time. The tunable laser source 30 is initially set to one wavelength in the band to be measured, and during measurement is set to each wavelength point in the and for which a measurement is desired.

The output of tunable laser source 30, is fed to one end of single mode fiber 130, which comprises a length of fiber to be characterized with regards to its dispersion characteristics, and is a long length of fiber not yet cut to length for use in any device such as a dispersion compensation device. Loop 60 is formed with a small enough diameter to emit a sufficient quantity of light energy at the point to which a dispersion measurement of single mode fiber 130 is desired. In one embodiment loop 60 is made around a circular object, while in another embodiment loop 60 is formed by holding it directly in place with tape. The fiber may continue to any length after the loop, as shown by the continuing length of single mode fiber 130. Light exiting loop 60 is detected by detector 70, which in one embodiment is a DET 410 made by Thorlabs, Inc., Newton, N.J. Detector 70 is placed in close proximity to loop 60, so as to receive as much light energy exiting loop 60 as possible. In an exemplary embodiment, detector 70 is placed directly adjacent to loop 60. In another embodiment detector 70 is held in a jig or movable stage (not shown) which allows for a fine adjustment of the positioning of detector 70 with respect to loop 60.

The output of detector 70 is connected to the input of optional amplifier 80, which in one embodiment is an RF amplifier model 5850 available from Picosecond Pulse Labs, Boulder, Colo. Any suitable amplifier may be utilized with the only criterion being that the amplifier is suitable for the pulses to be detected. The output of amplifier 80 is fed to oscilloscope 90, which has its trigger input 100 connected to electrical trigger output 25 of pulse generator 20. If the output of detector 70 is of sufficient amplitude, optional amplifier 80 is not utilized and the output of detector 70 is connected directly to the input of oscilloscope 90.

In calculating the dispersion, the difference in flight time between a reference wavelength and a measurement wavelength is calculated utilizing oscilloscope 90. In an exemplary embodiment, tunable laser source 30 is first set to 1530 nm and the pulse position is obtained by oscilloscope 90. Tunable laser source 30 is then set to 1535 nm, and again the pulse position is obtained by oscilloscope 90, and the differential in time is recorded as a data point. The procedure is repeated at every desired measurement wavelength, which in an exemplary embodiment comprises 2 nm steps. In another embodiment 5 nm steps are used, while in yet another embodiment 10 nm steps are used, and the dispersion of wavelengths in between two measured wavelengths is calculated by interpolation. It is to be understood that utilizing a digital oscilloscope the pulse positions may be measured without requiring physical observation. Furthermore, oscilloscope 90 may be replaced by any electronic measurement equipment capable of measuring the time difference for peaks at different wavelengths.

In an exemplary embodiment for each measurement wavelength multiple data points are taken and average is used. In one embodiment 128 points are utilized.

Table 1 indicates an example of measurements taken on a piece of HOM fiber, utilizing the system 10 of FIG. 1, where the loop 60 was placed 2.55 kilometers from the mode transformer 40.

TABLE 1

| Wavelength, nm | Time Shift from Base in ns | Dispersion in ps/nm/km |
|---|---|---|
| 1530 | Base | |
| 1535 | 1.7 | −133 |
| 1540 | 3.4 | −141 |
| 1545 | 5.3 | −145 |
| 1550 | 7.1 | −149 |
| 1555 | 9.1 | −165 |
| 1560 | 11.3 | −176 |
| 1565 | 13.6 | −196 |
| 1570 | 16.3 | −216 |
| 1575 | 19.1 | |

The value indicated in the dispersion column is calculated as follows:

$$\text{Dispersion (ps/nm/km)} = \frac{\text{TimeShift}(n \text{ sec}) * 1000 \text{ ps/ns}}{\text{Wavelength Difference (nm)} * \text{Length (km)}} \quad \text{Equation 1}$$

where TimeShift is defined as the average of the time shift to the next lower wavelength and the time shift to the next higher wavelength, and the Length is the distance of loop 60 from the first end of fiber 50, which is connected to the output of mode transformer 40.

Figure 3:
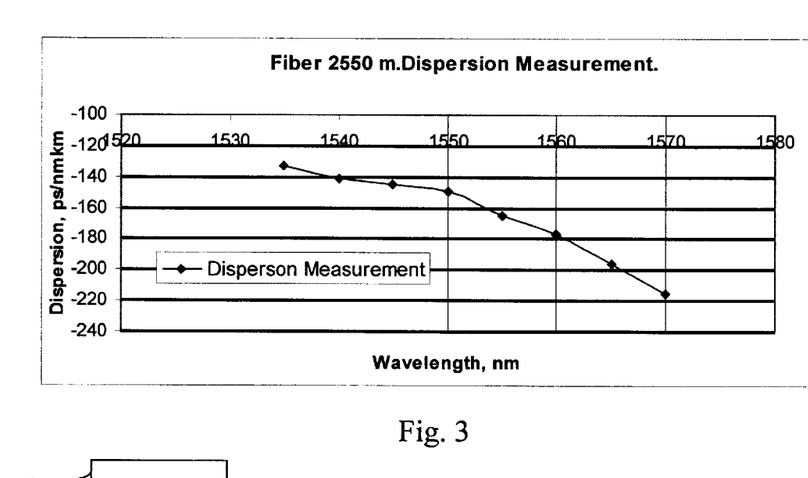
FIG. 3 depicts a chart of dispersion measurement.

FIG. 3 illustrates a plot of the dispersion graph of Table 1, and shows negative dispersion, which increases with increasing wavelength.

Figure 4:
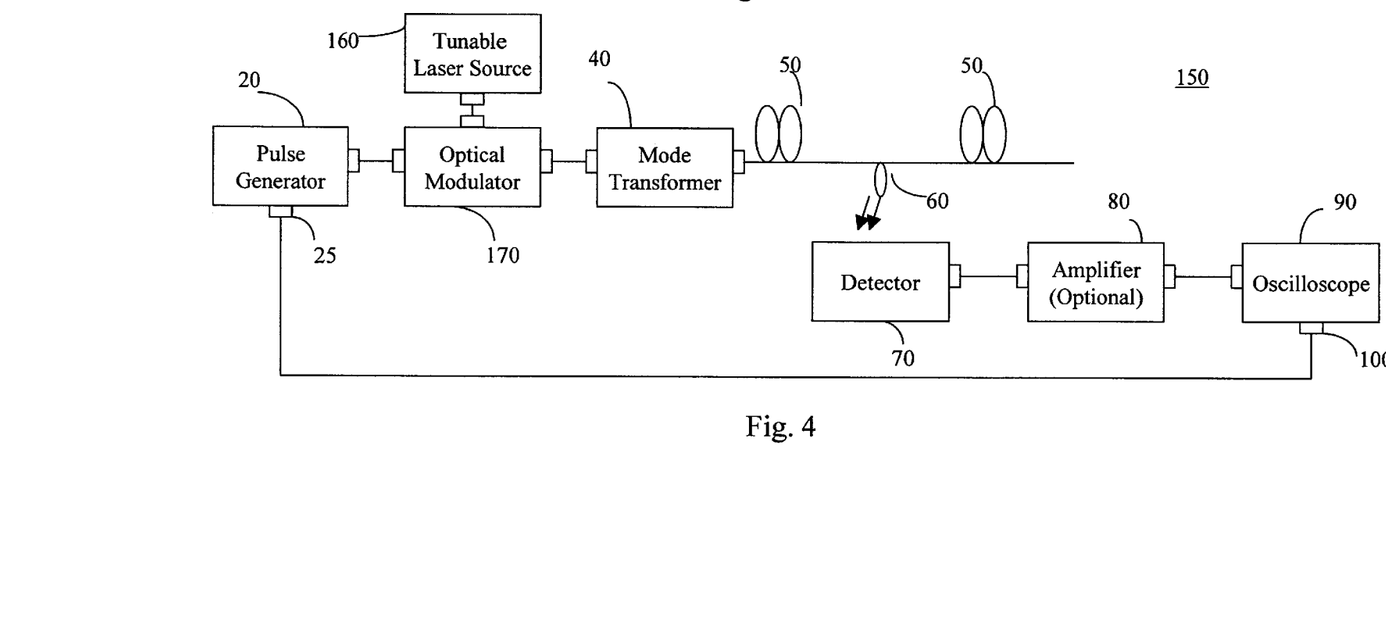
FIG. 4 depicts a high level block diagram of a third embodiment of a dispersion measurement system.

FIG. 4 illustrates a high level block diagram of a third embodiment of the invention comprising system 150 operable to measure dispersion of an uncut length HOM fiber in accordance with the teaching of the invention. System 150 comprises pulse generator 20 comprising trigger output 25, tunable laser source 160, optical modulator 170, mode transformer 40, HOM fiber 50, fiber loop 60, detector 70, optional amplifier 80 and oscilloscope 90 comprising trigger input 100. The output of pulse generator 20 is connected to the modulator input of optical modulator 170, the output of tunable laser source 160 is connected to the carrier input of optical modulator 170 and the output of optical modulator 170 is connected to the input of mode transformer 40. The output of mode transformer 40 is connected to one end of HOM fiber 50, and fiber loop 60 is formed at a distance from that end of HOM fiber 50 at the point at which dispersion is to be measured. Detector 70 is placed in proximity to fiber loop 60, and the output of detector 70 is connected to the input of optional amplifier 80. The output of optional amplifier 80 is connected to the input of oscilloscope 90, and trigger input 100 of oscilloscope 90 is connected to trigger output 25 of pulse generator 20.

In operation, system 150 operates in all respects in the same manner as the system 10 of FIG. 1, however tunable laser source 30 is replaced with tunable laser source 160, which is not designed to be externally modulated, and is utilized in combination with an optical modulator 170. The output of pulse generator 20 is connected to the modulation input of optical modulator 170, which in an exemplary embodiment is a 1 Ghz optical modulator. Tunable laser source 160 is connected to the optical carrier input of optical modulator 170. In operation, the output of optical modulator 170 comprises light at the wavelength of tunable laser source 160 modulated by pulse generator 20, and thus comprises light energy only during the pulse of the generator. Optionally, optical modulator 170 comprises an optical amplifier to boost the output to a useable level.

The output of optical modulator 170 is connected to the input of mode transformer 40, and thus injects the modulated signal into the mode transformer in the same manner as described in connection with system 10 of FIG. 1. A separate optical amplifier (not shown) can be connected between the output of optical modulator 170 and the input of mode transformer 40 if required to boost the output to desired levels.

Figure 5:
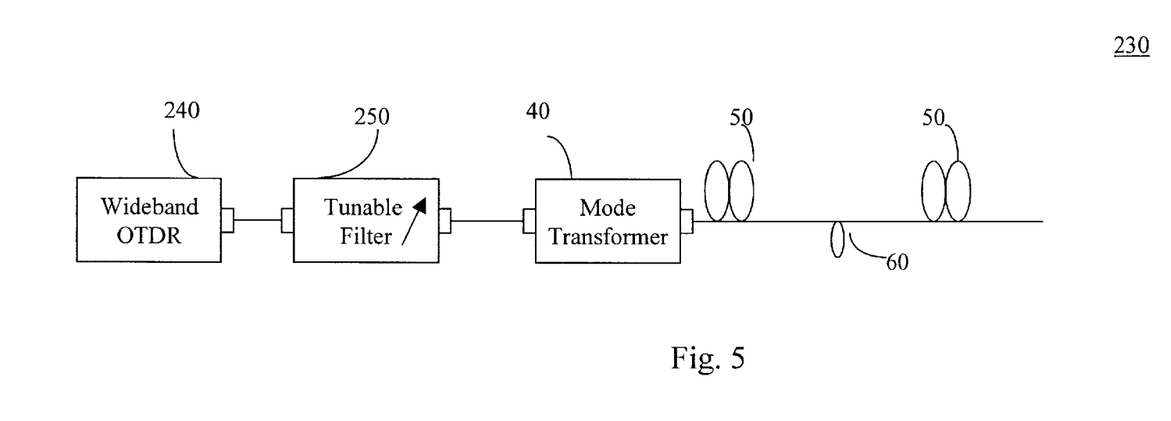
FIG. 5 depicts a high level block diagram of a fourth embodiment of a dispersion measurement system.

FIG. 5 illustrates a high level block diagram of a system 180 depicting a fourth embodiment of the invention comprising wideband optical time domain reflectometer (OTDR) 240, optical tunable filter 250, mode transformer 40, HOM fiber 50 and fiber loop 60. Wideband OTDR 240 is connected to one port of tunable filter 250, and the other port of tunable filter 250 is connected to one port of mode transformer 40. The other port of mode transformer 40 is connected to one end of HOM fiber 50, and fiber loop 60 is formed at a distance from that end of HOM fiber 50 to which dispersion is to be measured. HOM fiber 50 comprises a length of fiber whose dispersion characterization is desired, and is a long length of fiber not yet cut to length.

Wideband OTDR 240 is an OTDR with a wideband source, capable of covering the range of wavelengths for which dispersion measurement is desired. In an exemplary embodiment, wideband OTDR 240 is an Optical Fiber Monitor such as the OFM 130 available from Opto-Electronics, Inc. of Oakville, Canada. The output of wideband OTDR 240 is connected to the input of optical tunable filter 250, which allows tuning the output to a small bandwidth, preferably on the order of 1 nm. In an exemplary embodiment, optical tunable filter 250 is a manually tunable optical filter such as the OTF-300 available from Santec, Aichi, Japan.

In operation, the dispersion experienced by a signal traversing HOM 50 is a function of length, and the dispersion characteristic of HOM 50 may vary along its length. At the point to which a dispersion measurement of HOM 50 is desired, a loop 60 with a diameter designed to cause a significant amount of loss to the desired high order mode is made. Such a loop may be made around a circular object, or held in place with tape. The exact diameter is known to those skilled in the art, however in an exemplary embodiment, a loop of diameter 1.5 cm is utilized. The fiber may continue at any length after the loop as shown by the continuing length of HOM fiber 50. Wideband OTDR 240 sends pulses of light which are filtered through tunable filter 250, so that only a narrow, tunable, band of wavelengths are input to mode transformer 40. Wideband OTDR 240 receives reflected signals, and displays these reflected signals as a distance between the wideband OTDR's output and the source of the reflection. The wideband OTDR distance calculation is based on the speed of light traveling through the optical fiber calculated at a basic wavelength, typically 1550 nm, and the time delay between the light pulse exiting wideband OTDR 240 until its reflection is detected at wideband OTDR 240. Mode transformer 40 acts in a bidirectional fashion to convert the light energy received from tunable optical filter 250 to the desired single high order mode, and light reflected from loop 60 to the fundamental mode. Loop 60 causes a large loss in light energy in the section of HOM 50 after loop 60, with a resultant drop in reflected light.

Figure 6:
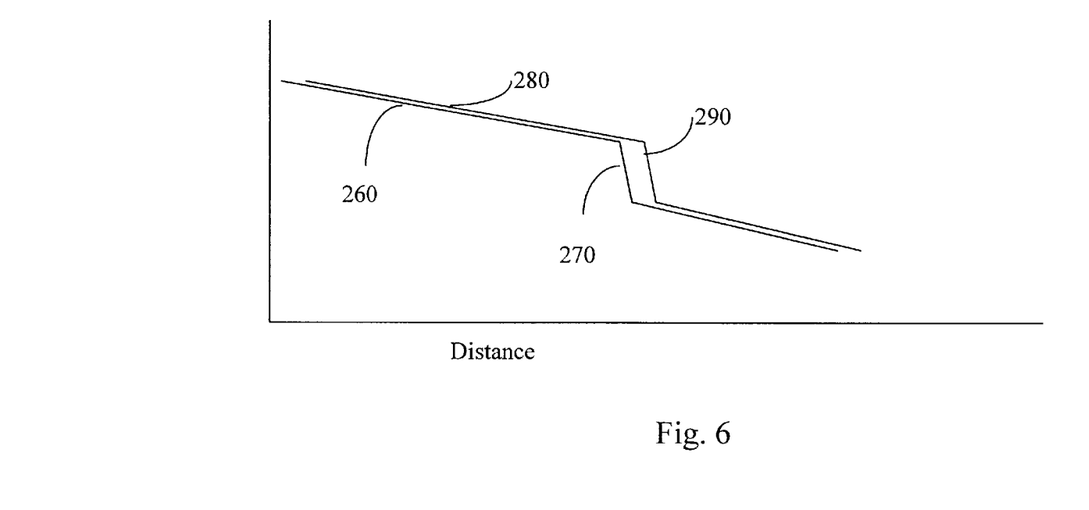
FIG. 6 depicts a chart of OTDR length measurements according to the fifth embodiment.

FIG. 6 illustrates the display of wideband OTDR 240 for different wavelength settings of tunable filter 250. The x-axis represents distance as calculated by the wideband OTDR 240, and the y-axis represents intensity in arbitrary units. Line 260 represents the reflected signal received when the laser source is set to the base wavelength, and shows a sharp drop at distance 270, indicative of the location of loop 60. In an exemplary embodiment, the base wavelength is 1530 nm. Line 280 represents the reflected signal received when the laser source is set to a longer wavelength, and shows a sharp drop at distance 290, indicative of the location of loop 60. The difference in displayed location between distance 270 and distance 290 is caused by the difference in group delay between the two wavelengths.

The differential in distance is displayed by wideband OTDR 240 by taking the time differential between the pulse being sent and receipt of the reflection, and dividing by the speed of light through the fiber at a predetermined wavelength. Typically this wavelength is 1550 nm, and the speed of light is approximately $3\times10^8$ meters/second, or $3\times10^{-4}$ meters/picosecond. The group index experienced by wideband OTDR 240 in the exemplary $LP_{02}$ mode is 1.446 at 1550 nm, and is indicated by $n_{OTDR}$. Using two wavelengths, and knowing the distance between wideband OTDR 240 and loop 60, represented as Length(km) the dispersion is calculated as:

$$\text{Dispersion (ps/nm/km)} = \frac{n_{OTDR} * \Delta\text{Length (meters)}}{\Delta\text{Wavelength (nm)} * 3 * 10^{-4} \text{ meters/ps} * \text{Length (km)}}. \quad \text{Equation 2}$$

The difference in the height of each curve can also be used to calculate loss at each wavelength.

Figure 7:
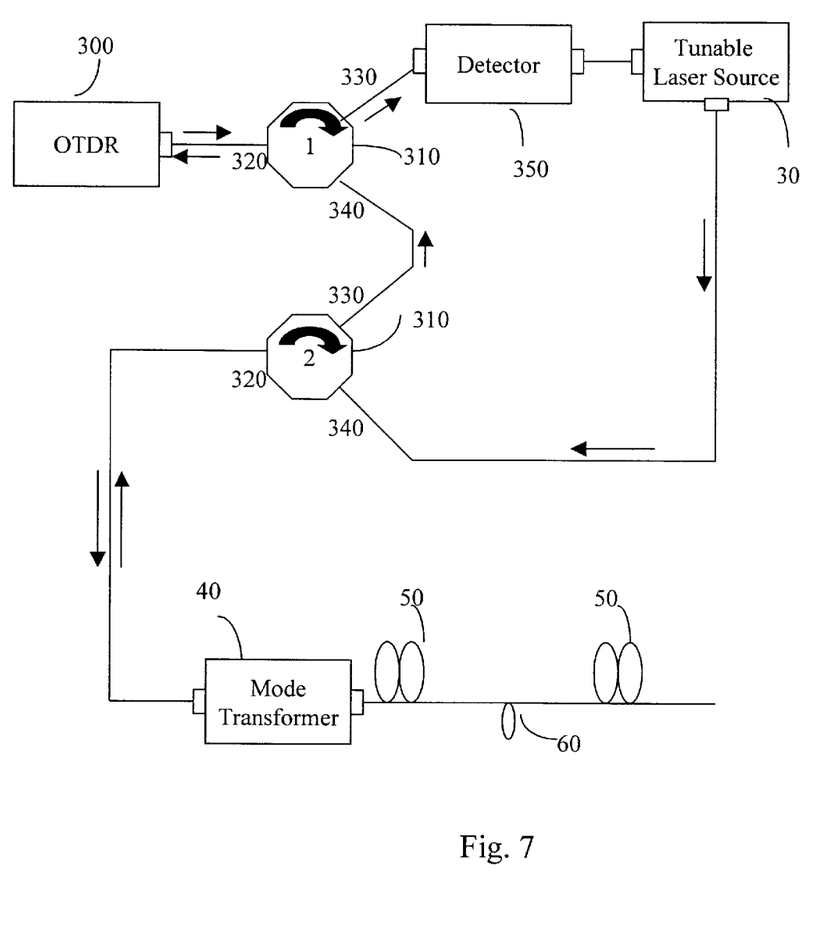
FIG. 7 depicts a high level block diagram of a sixth embodiment of a dispersion measurement system.

FIG. 7 illustrates a high level block diagram of a fifth embodiment of the invention, comprising OTDR 300, circulators 310 comprising ports 320, 330 and 340, detector 350, tunable laser source 30, mode transformer 40, HOM fiber 50 and fiber loop 60. OTDR 300 is connected to port 320 of first circulator 310, and port 330 of first circulator 310 is connected to the input of detector 350. Port 340 of first circulator 310 is connected to port 330 of second circulator 310. The output of detector 350 is connected to the gating input of tunable light source 30, and the output of tunable light source 30 is connected to port 340 of second circulator 310. Port 320 of second circulator 310 is connected to one port of bidirectional mode transformer 40, and the second port of mode transformer 40 is connected to a first end of HOM fiber 50. Fiber loop 60 is formed at a distance from the first end of HOM 50 at a point to which dispersion is to be measured. OTDR 300 may be any commercially available OTDR. Loop 60 is made with a diameter designed to cause a significant amount of loss to the desired high order mode is made.

In operation, OTDR 300 transmits optical pulses at regular intervals to port 320 of first circulator 310. The signal received at port 320 is output at port 330 of first circulator 310 and is connected to the input of detector 350, which acts to convert the optical pulse to an electrical pulse. The electrical pulse generated by detector 350 is connected to the gating input of tunable laser source 30, which thus generates a tunable pulse of light triggered by the optical pulse of OTDR 300. The tunable pulse of light outputted by tunable laser source 30 is connected to port 340 of second circulator 310, which outputs the tunable pulse of light at port 320 of second circulator 310. Port 320 of second circulator 320 is connected to one end of bidirectional mode transformer 40, which acts to converts the light energy of the tunable pulse of light substantially to a single high order mode. In an exemplary embodiment the mode is the $LP_{02}$ mode. The other end of mode transformer 40 is connected to one end of HOM fiber 50, which has a loop 60 at the length to which dispersion is to be measured. HOM fiber 50 may continue past the end of loop 60, thus allowing for characterization of fibers prior to cutting them.

Reflected light from HOM fiber 50 is converted to the fundamental mode by mode converter 40, and is connected to port 320 of second circulator 310. Light input at port 320 is output at port 330 of second circulator 310, which is connected to port 340 of first circulator 310. Light input at port 340 is output at port 320 of first circulator 310 and is received by OTDR 300. Reflected light from the tunable pulse of light, triggered by OTDR 300, is thus received back at OTDR 300, and a length measurement is displayed. Tunable laser source 30 is set to different wavelengths, and dispersion is calculated as described above in relation to FIG. 6, utilizing equation 2.

The above description utilizes mode transformer 40 to excite primarily a single high order mode in HOM fiber 50, however this is not meant to be limiting in any way. More than one mode may be excited in HOM 50, and stripped away with appropriately sized loops located between mode transformer 40 and loop 60. In another embodiment the invention is used to measure the dispersion in the fundamental mode, and mode transformer 40 is not utilized. Fiber 50 may then be a multimode fiber, an HOM fiber or a single mode fiber.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. An apparatus for measuring dispersion of a section of optical fiber beginning at one end of said fiber and ending at a point before the second end of the fiber comprising:
   a light source forgenerating an optical measurement signal, said light source being optically connected to one end of an optical fiber;
   a loop formed in said optical fiber at a point to which dispersion is to be measured, said loop being designed to modify the propagation of said optical measurement signal, and
   a time delay measurement apparatus;
   wherein the wavelength of said optical measurement signal is variable and said time delay measurement apparatus is operable to detect the change in propagation time from said one end of said optical fiber to said loop as a function of wavelength.

2. The apparatus of claim 1 further comprising a pulse generator, said pulse generator being operable to modulate said light source.

3. The apparatus of claim 1 further comprising a detector, said detector being operable to detect said modification to the propagation of said optical measurement signal.

4. The apparatus of claim 1 where said optical fiber is a high order mode fiber.

5. The apparatus of claim 4 further comprising a mode transformer, operable to transform said optical measurement signal to a high order mode.

6. The apparatus of claim 1 wherein said modification comprises increasing the amount of detectable light escaping from said optical fiber.

7. The apparatus of claim 1 wherein said modification comprises increasing the amount of loss experienced by said optical measurement signal.

8. The apparatus of claim 1 wherein said light source comprises a tunable laser.

9. The apparatus of claim 1 wherein said time delay measurement apparatus comprises an oscilloscope.

10. The apparatus of claim 1 wherein said time delay measurement apparatus comprises an optical time domain reflectometer.

11. A method for measuring dispersion of a section of optical fiber beginning at one end of the fiber and ending at a point before the second end of the fiber comprising:
   generating an optical measurement signal;
   injecting said optical measurement signal into one end of an optical fiber, thereby propagating said optical measurement signal in said optical fiber;
   modifying the propagation of said optical measurement signal at the desired measurement point;
   varying the wavelength of said optical measurement signal, and
   measuring the change in propagation time from said one end of said optical fiber to said desired measurement point as a function of said varying wavelength.

12. The method of claim 11 wherein said optical measurement signal comprises optical pulses.

13. The method of claim 11 further comprising the step of detecting said modification to the propagation of said optical measurement signal.

14. The method of claim 11 where said optical fiber is a high order mode fiber.

15. The method of claim 14 further comprising the step of transforming said optical measurement signal to a high order mode.

16. The method of claim 11 wherein said modifying comprises increasing the amount of detectable light escaping from said optical fiber.

17. The method of claim 11 wherein said modifying comprises increasing the amount of loss experienced by said optical measurement signal.

18. The method of claim 11 wherein said optical measurement signal is generated by a tunable laser.

19. The method of claim 11 wherein said measuring is accomplished by an oscilloscope.

20. The method of claim 11 wherein said measurement is accomplished by an optical time domain reflectometer.

* * * * *